(12) United States Patent
Jurova et al.

(10) Patent No.: US 9,626,173 B1
(45) Date of Patent: Apr. 18, 2017

(54) NON SPECIFICATION SUPPORTED APPLICATION DEPLOYMENT DESCRIPTORS AND WEB APPLICATION DEPLOYMENT DESCRIPTORS

(75) Inventors: Maria G. Jurova, Sofia (BG); Mariela T. Todorova, Pleven (BG); Monika M. Kovachka-Dimitrova, Sofia (BG)

(73) Assignee: SAP SE, Walldorf (DE)

( * ) Notice: Subject to any disclaimer, the term of this patent is extended or adjusted under 35 U.S.C. 154(b) by 1831 days.

(21) Appl. No.: 10/864,189

(22) Filed: Jun. 8, 2004

(51) Int. Cl.
*G06F 9/445* (2006.01)

(52) U.S. Cl.
CPC . *G06F 8/64* (2013.01); *G06F 8/60* (2013.01)

(58) Field of Classification Search
USPC ......................................... 717/116, 168–178
See application file for complete search history.

(56) References Cited

U.S. PATENT DOCUMENTS

| | | | | |
|---|---|---|---|---|
| 6,098,093 | A * | 8/2000 | Bayeh et al. | 709/203 |
| 6,360,331 | B2 * | 3/2002 | Vert et al. | 714/4 |
| 6,892,382 | B1 * | 5/2005 | Hapner et al. | 717/174 |
| 6,976,061 | B1 * | 12/2005 | Sharma | 709/220 |
| 7,089,584 | B1 * | 8/2006 | Sharma | 726/4 |
| 7,260,819 | B2 * | 8/2007 | Spotswood et al. | 717/177 |
| 2003/0229888 | A1 * | 12/2003 | Spotswood et al. | 717/116 |
| 2004/0078495 | A1 * | 4/2004 | Mousseau et al. | 710/1 |
| 2005/0049998 | A1 * | 3/2005 | Ruhlow et al. | 707/1 |
| 2005/0262477 | A1 * | 11/2005 | Kovachka-Dimitrova et al. | 717/118 |
| 2006/0041643 | A1 * | 2/2006 | Fanshier | 709/220 |
| 2007/0288920 | A1 * | 12/2007 | Spotswood et al. | 717/177 |

OTHER PUBLICATIONS

Panda, "Using Timers in J2EE Applications", Oct. 2004, ONJava. com, http://www.onjava.com/pub/a/onjava/2004/10/13/j2ee-timers. html.*
Shannon "Java 2 Platform Enterprise Edition Specification, v1.3", Jul. 2001, sun microsystems.*
"BEA WebLogic Server: Developing WebLogic Server Applications", 2002, release 8.1.*

* cited by examiner

*Primary Examiner* — Jason Mitchell
(74) *Attorney, Agent, or Firm* — Schwegman Lundberg & Woessner, P.A.

(57) ABSTRACT

A method is described that inserts first and second deployment descriptors into an application archive file. The first deployment descriptor conforms to a first document type definition that is defined by a standard specification. The second deployment descriptor conforms to a second document type definition that is not defined by the standard specification. The second deployment descriptor has an element that is directed to a service that is an extension to the services offered by an environment described by the standard specification. The first and second deployment descriptors provide configuration information selected from the group consisting of: a) configuration information that pertains to the application as a whole; and, b) configuration information that pertains to a web application portion of the application.

50 Claims, 7 Drawing Sheets

NON SPECIFICATION SUPPORTED APPLICATION DEPLOYMENT DESCRIPTORS AND WEB APPLICATION DEPLOYMENT DESCRIPTORS

FIELD OF INVENTION

The field of invention relates generally to the software arts; and, more specifically to non specification supported application deployment descriptors and web application deployment descriptors.

BACKGROUND

Application Deployment

In the field of enterprise application software, "deploy tools" are used to deploy a software application onto one or more destination computing systems such as a server or a cluster of servers. FIG. 1 provides an exemplary depiction of a deploy tool 103 that converts various source files stored on a data storage resource 101 (e.g., one or more hard disk drives) into an appropriate format for deployment on a server 113.

For ease of understanding FIG. 1 has been drawn so as to at least apply to a Java 2 Enterprise Edition (J2EE) environment which is recognized in the art as being a "component based" object-oriented environment. Component based software environments use granules of software (referred to as "components" or "component instances") to perform basic functions. The functional granularity offered by a plurality of different components provides a platform for developing a multitude of more comprehensive tasks. Some examples of component based architectures besides J2EE include Common Object Request Broker Architecture (CORBA), Component Object Model (COM), Distributed Component Object Model (DCOM) and derivatives there from.

Assuming that the application whose source files are stored on the data storage resource 101 performs "back-end" business logic as well as provides some form of web interface (also referred to as a "web application"), the various source files within data storage resource 101 may include business logic source code designed to make use of business logic components (e.g., Enterprise Java Beans (EJBs) in the case of a J2EE environment) and web application source code designed to make use of web application components (e.g., pages, servlets, etc.). Here, the source files may include classfiles for creating the objects from which the application's components are constructed.

The various source files from which the application is constructed are passed to an archive builder 104. The archive builder 104 creates two separate archive files: 1) a first archive file (referred to as a .JAR file) that contains the application's business logic components; and, 2) a second archive file (referred to as a .WAR file) that contains the application's web application components. The .JAR and .WAR files are then combined into a third archive file (an enterprise archive file (.EAR)) file by an assembler 105. An archive file is a file that contains other files.

FIG. 1 depicts the contents of the .EAR file 106. Apart from the component contents within the .JAR and .WAR files 108, 109, the .EAR file 106 also includes an "application" deployment descriptor 107 (application.xml) and the .WAR file 109 contains a "web application" deployment descriptor 110 (web.xml). The role of the deployment descriptors 107, 109 are discussed in more detail further below in the immediately following section.

The .EAR file is sent to a deployer 111 by the assembler 105. The deployer analyzes the .EAR file and sends its various pieces to their appropriate destination(s). In the simple situation of FIG. 1, the contents of the .JAR file are sent to a bean container 115 and the contents of the .WAR file are sent to a web container 116. The server is assumed to have a base environment 114 that provides a number of base services 120 for the applications that are executed within the environment 114. For example, a security service may be one of the services associated with the base environment's set of services 120. In the case of J2EE, the base environment 114 is typically Java 2 Standard Edition (J2SE) and the base services 120 are those services provided by J2SE (e.g. "security" among others).

The containers 115, 116 themselves can be viewed as sub environments of the base environment 114 each having an additional layer of services 119 that exist "on top of" the services 119 associated with the base environment 120. In the case of J2EE, the environment of both containers 115, 116 is a J2EE environment and the additional layer of services 119 for each container are those provided by J2EE (e.g., Java Naming and Directory Interface (JNDI), Java Database Connectivity (JDBC), Java Messaging Service (JMS) among others).

Deployment Descriptors

A deployment descriptor is a text file associated with an application that contains configuration information for that application. Because text files can be easily created and modified, the inclusion of an application's configuration information into a text file allows different instances of the same application to be easily deployed with different configuration settings (e.g., a first set of configuration settings for a first deployment into a first server and a second set of configuration settings for a second deployment into a second server).

In order to set the desired configuration for any deployment situation, the possible content and format of the deployment descriptor needs to be predefined before beforehand. As such, the possible substance and manner of organization of a deployment descriptor (a format referred to as the deployment descriptor's "document type definition" (DTD)) is purposely defined so that the deployment environment is able to read and understand the information contained in the deployment descriptors 107, 110.

For example, in the case of J2EE, the DTD for the application level deployment descriptor 107 is defined in Java™ 2 Platform, Enterprise Edition Specification Version 1.3. Copyright 1999-2000, Sun Microsystems, Inc. Available at http://java.sun.com/j2ee/docs.html (hereinafter referred to as "the J2EE specification"); and, the DTD for the web application deployment descriptor 110 is defined in Java™ Servlet Specification, Version 2.3. Copyright 1998-2000, Sun Microsystems, Inc. Available at http://java.sun.com/products/servlet. FIG. 2 shows respective depictions 207, 210 of both of these J2EE DTDs. Because these J2EE DTDs 207, 210 are well understood they need not be thoroughly reviewed here in detail. However, some review is appropriate so that a basic understanding can be readily gained.

With respect to the application J2EE DTD 207, note that this DTD 207 allocates for configuration information that pertains to: 1) the displayed name of the application 220; 2) a human readable description of the application 221; 3) the displayed icon for the application 222; 4) a list of the application's bean components 223, web components 224, and application client components 225; and, 5) a list of security roles defined for that application 226.

With respect to the web application J2EE DTD 210, note that this DTD allocates for configuration information that pertains to, among other things: 1) the displayed name of the application's web interface (also referred to as its "web application") 227; 2) a list of the web application's servlets 228; 3) a list of the mappings between servlets identified in 2) above and URL patterns for them 229; and, 4) whether or not the web application might call upon a bean component in order to execute its functions 230. Note that just some of the possible configuration items that may be found in a J2EE DTD are shown in application.xml 207 and web.xml 210 of FIG. 2 (i.e., the J2EE specification provides for more features than those observed in FIG. 2).

The DTD's 207, 210 as described above are defined by the J2EE Specification. Nevertheless it may be useful in at least some situations to configure with deployment descriptors certain parameters of an application other than those parameters specifically allocated for by the J2EE specification's DTDs.

SUMMARY

A method is described that inserts first and second deployment descriptors into an application archive file. The first deployment descriptor conforms to a first document type definition that is defined by a standard specification. The second deployment descriptor conforms to a second document type definition that is not defined by the standard specification. The second deployment descriptor has an element that is directed to a service that is an extension to the services offered by an environment described by the standard specification. The first and second deployment descriptors provide configuration information selected from the group consisting of: a) configuration information that pertains to the application as a whole; and, b) configuration information that pertains to a web application portion of the application.

FIGURES

A better understanding of the present invention can be obtained from the following detailed description in conjunction with the following drawings, in which.

DETAILED DESCRIPTION

A standard specification, or simply "a standard", is a description of a software environment's features; where, unrelated groups of software developers (e.g., software groups from different corporations) design or are expected to design software that complies with the description. By designing to a same standard specification it is hoped that software produced by different groups of software developers will be "interoperable". Frequently, however, developers may desire to extend the functionality of their software beyond that specified by the standard specification to which they are designing.

As such, an "interoperability" issue may exist if an attempt is made to integrate "extended" software (i.e., software having features that are not specified by the standard) with software that has no ability to relate to these extensions. For example, if an attempt is made to integrate software with extensions developed by a first corporation with software developed by a second corporation that has no ability to relate to these extensions, it may not be possible to functionally integrate the software from the two different corporations together.

In this case, it is helpful to "turn-off" any function related to the extensions so that the various software products can work together according to the standard specification. By contrast, if an attempt is made to integrate software with extensions with software that has the ability to relate to these extensions (e.g., two software products from the same corporation), it is helpful to "turn-on" all functions related to the extensions so that the full functionality of the extensions can be utilized.

Therefore, software designed around a standard specification but having functional extensions beyond what is described by the standard specification may have a first mode that "hides" these extensions (e.g., so as to be interoperable with software that does not comprehend the extensions) and a second mode that does not hide these extensions (e.g., so as to be interoperable with software that does comprehend the extensions).

Figure 1:
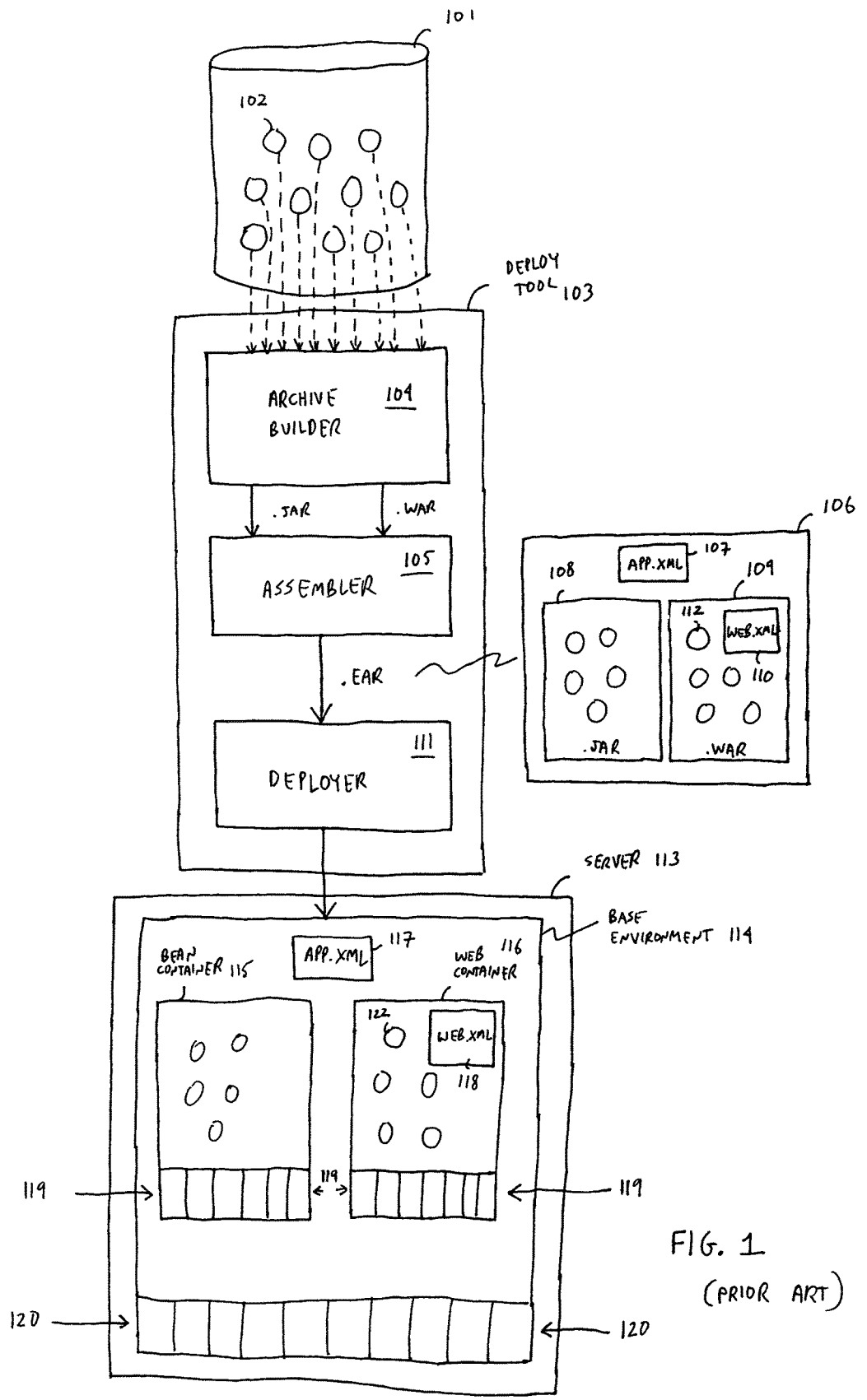
FIG. 1 (prior art) shows an embodiment of a deploy tool.
Figure 3:
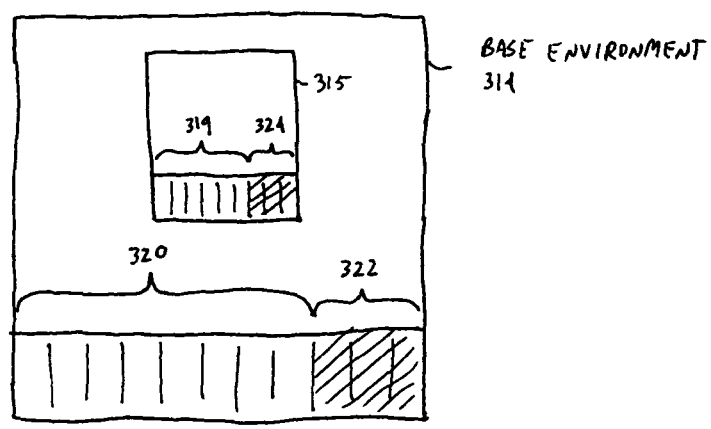
FIG. 3 shows in a single figure an environment that does not have any service extensions and an enhanced environment having service extensions.

FIG. 3 elaborates on this in more detail. FIG. 3 shows in a single figure an environment that does not have any service extensions and an enhanced environment having service extensions. FIG. 3 is also comparable to FIG. 1. Recall from the background that FIG. 1 shows a server 113 that is assumed to have a base environment 114 that provides a number of base services 120 for the applications that are executed within the environment 114. Containers 115, 116 within the base environment 114 can be viewed as sub environments each having an additional layer of services 119 that exist "on top of" the services 119 associated with the base environment 120.

FIG. 3 shows a base environment 314 having base services 320 if no service extensions are present (i.e., if the base services are those described by the standard specification) and base services 320 and 322 if service extensions are present. That is, services 322 correspond to an extension of the services 320 that are defined by the standard specification.

Likewise, the base environment 314 also includes a container 315 having an additional layer of services. The additional layer of services are limited to those 319 defined by the standard specification if no service extensions are present; and, are extended so as to include services 324 if service extensions are present. Thus, if the base environment 314 is limited to the standard specification its set of services are limited to services 320 and 319 (e.g., in the case of J2EE, services 320 correspond to those defined by the J2SE standard specification and services 319 correspond to those defined by the J2EE standard specification); or, if the base environment 314 has extensions beyond the standard specification its set of services include services 320, 322 and services 319, 324.

Here, if the base environment 314 does not include any service extensions, the deployment descriptors that are used to deploy applications within the base environment should not include any information that points to a service extension. By contrast, if the base environment 314 includes service extensions; then, the deployment descriptors that are used to deploy applications within the base environment may include information that points to a service extension.

The problem of configuring into deployment descriptors "new" application settings that are not provided for by a standard specification can be understood with reference to the concept of service extensions. For example, if a deploy tool is to deploy applications onto one or more servers having service extensions, the corresponding deployment descriptors should be permitted to make reference to these service extensions. Likewise, if this same deploy tool is to also deploy applications onto one or more servers that do not have service extensions, the corresponding deployment descriptors should not be permitted to make reference to any such extensions.

Figure 4:
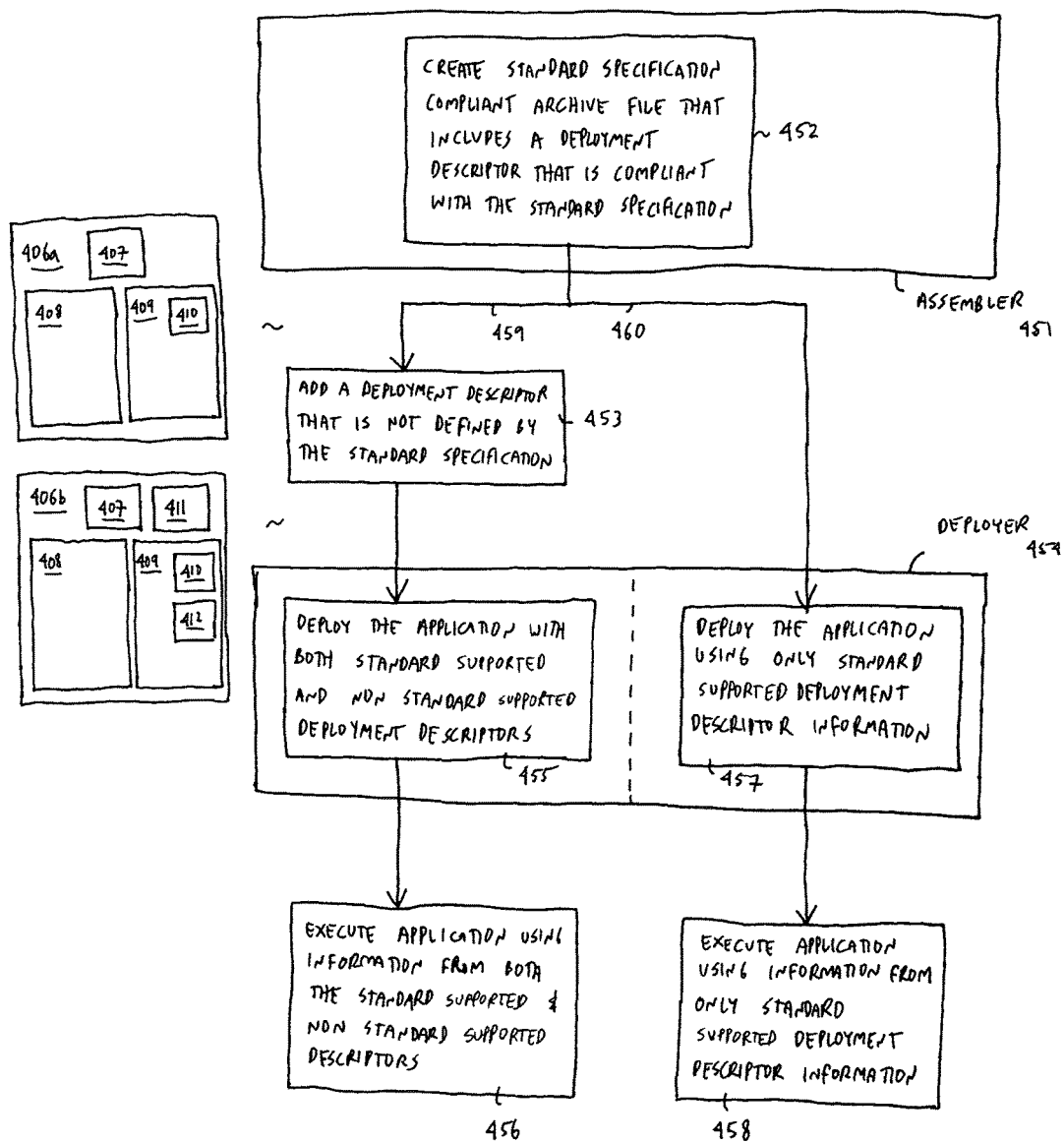
FIG. 4 shows a methodology for configuring an application with deployment descriptor information that is and is not provided for by a standard specification.

FIG. 4 shows a methodology for a deployment tool that can deploy applications whose deployment descriptors: 1) include information that is not specified by the applicable standard specification (e.g., for a situation where the target server(s) include service extensions as described above with respect to FIG. 3); or, 2) do not include information that is not specified by the applicable standard specification (e.g., for a situation where the target server(s) do not include service extensions as described above with respect to FIG. 3). If the deployment descriptors include information that is not specified by the applicable standard, the information may (but is not required to) reference a service extension.

According to the methodology of FIG. 4, a prior art assembly process 452 as performed by a typical assembler 451 creates an archive file (e.g., a .EAR file) that is coextensive with the standard specification (i.e., all of its deployment descriptor information is defined in the applicable standard specification). An exemplary .EAR archive file 406a produced by process 452 is also drawn in FIG. 4. Note that the file format of file 406a is identical to that 106 observed in FIG. 1 (i.e., an application deployment descriptor 107, 407; a .JAR file 108, 408; a .WAR file 109, 409; and a web application deployment descriptor 110, 410).

Once the archive file 406a that is fully supported by the standard specification is created, if additional information not found in the standard specification is desired to be placed into the application's deployment descriptor information, path 459 is followed and another deployment descriptor (e.g., either or both of deployment descriptors 411, 412) is added 453 to the original file 406a. Each new deployment descriptor 411, 412 contains information that is not provided for by the standard specification. The addition of new deployment descriptors 411, 412 essentially forms a new archive file 406b. Note that the additional deployment descriptors 411, 412 could be added 453 by either the assembler 451 or the deployer 454.

According to the exemplary files depicted in FIG. 4, deployment descriptor 411 corresponds to a second application deployment descriptor that contains configuration information not provided for in the application deployment descriptor described by the standard specification; and, deployment descriptor 412 corresponds to a second web application deployment descriptor that contains configuration information not provided for in the web application deployment descriptor described by the standard specification. Again, at least some of the information contained by the new deployment descriptors 411, 412 may make reference to service extensions that exist in the environment(s) targeted for the application's deployment.

It is important to point out that other deployment descriptor information (which may or may not include information that extends beyond the applicable specification) may also be embedded in the application's archive files. For example, in the case of J2EE, multiple modules may be used to construct an application such as: 1) application client; 2) connector; 3) EJB; and 4) web. The web application deployment descriptors apply to the web module and the application deployment descriptors apply to the application as a whole. It is possible that the other deployment descriptor information (e.g., such as deployment descriptor that applies to EJB) may also be formatted for the application.

The application to which file 406b refers is then deployed 455 by a deployer 454 within the base environment and eventually executed within the base environment. The execution causes the application to be handled 456 in accordance with the configuration information contained in each of the deployment descriptor files 407, 411, 410, 412.

If the deployment descriptor information is expected to contain only information provided for by the standard specification (e.g., if the base environment does not comprehend the extensions that can be configured by the non standard specification deployment descriptors 411, 412); then, path 460 is followed after the initial assembly process 452 which avoids the creation of any non standard specification deployment descriptors 411, 412. As such, the original archive file 406a is not modified and the deployment and execution of the application does not invoke the use of non standard specification deployment descriptors 457, 458.

In alternate implementations, deployment descriptors containing information that is not described by the standard specification could be introduced by the "provider" of the application. The provider of an application is a source of an application (e.g., a location where the application is stored). Often the provider provides the application in its final archive file form (e.g., in .EAR format). As such, the provider could be configured to provide the additional "non standard based" deployment descriptor information. In another alternative approach additional non standard based deployment descriptor information is introduced at the server(s) targeted for deployment of the application.

Note that in a typical situation the base environment of the server upon which the application is deployed will interpret the combination of the standard specification supported and non standard specification supported application deployment descriptors as the total application deployment descriptor information for the application. Likewise, the web container of the server upon which the web application is deployed will interpret the combination of the standard specification supported and the non standard specification supported web application deployment descriptors as the total web application deployment descriptor information for the application.

The server(s) upon which the application is deployed may be Java 2 Enterprise Edition ("J2EE") server node(s) which support Enterprise Java Bean ("EJB") components (at the business layer) and Servlets and Java Server Pages ("JSP") (at the presentation layer). It is believed that other embodiments may be implemented in the context of various other software platforms.

Figure 5:
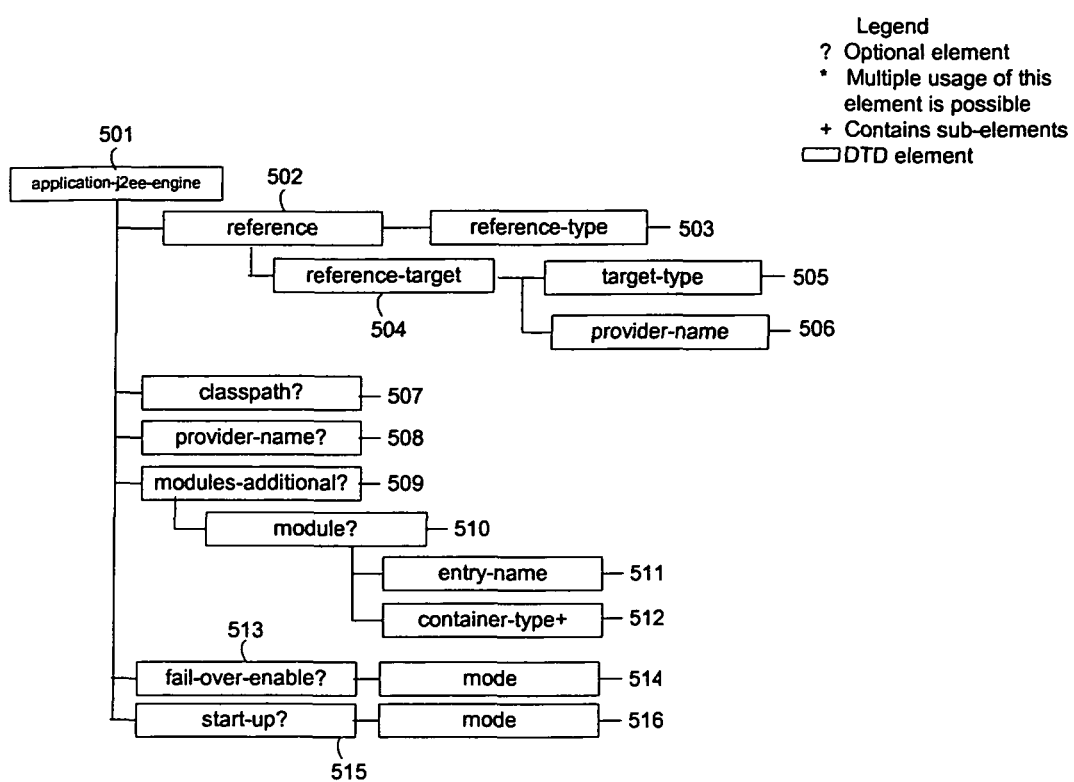
FIG. 5 shows an embodiment of a J2EE application deployment descriptor DTD that is not provided for by the J2EE standard specification.
Figure 6:
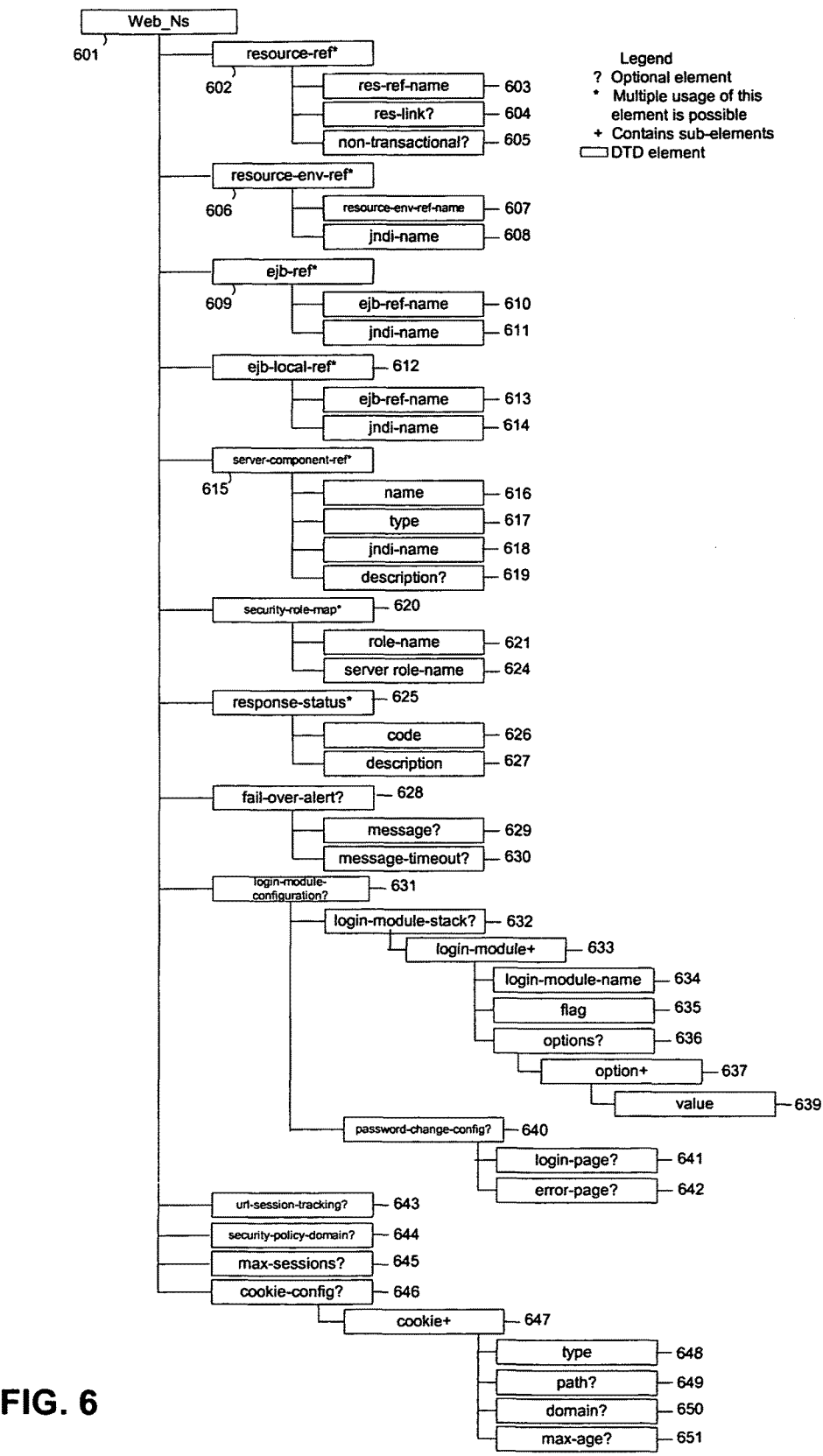
FIG. 6 shows an embodiment of a J2EE web application descriptor DTD that is not provided for by the J2EE standard specification.

FIGS. 5 and 6 show embodiments of application and web application DTDs for J2EE deployment descriptors. The DTDs observed in FIGS. 5 and 6 are not described in the J2EE specification and therefore correspond to DTDs that are not coextensive with the J2EE specification. Although the substance of material discussed with respect to FIGS. 5 and 6 relate to a J2EE application, it should be clear that at least some of the concepts described therein should be extendable in certain circumstances to similar approaches taken outside of a J2EE context. The same may be said for the methodology and corresponding discussion of FIGS. 3 and 4 above.

Non Standard Specification Application Deployment Descriptor Embodiment

FIG. 5 shows an embodiment of a J2EE application deployment descriptor DTD that is not provided for by the J2EE standard specification. A description of the relevance and use of each item in the DTD of FIG. 5 is provided immediately below. As alluded to above, an application deployment descriptor includes information that pertains to the application as a whole.

Root Element

Application_NS 501 is the root element for the deployment descriptor of FIG. 5. All items in the deployment descriptor can be obtained through the root element 501.

REFERENCE

Figure 2:
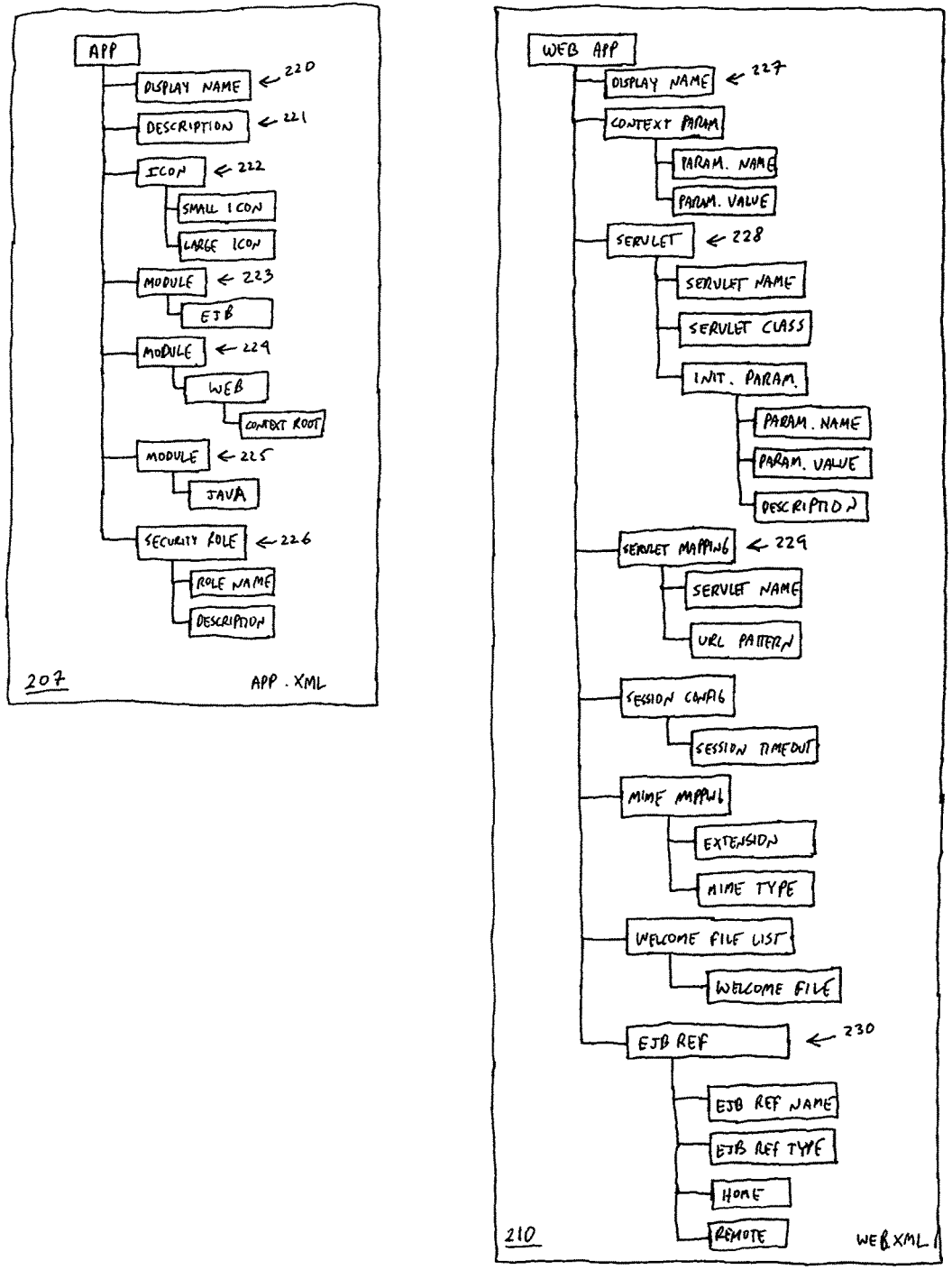
FIG. 2 (prior art) shows a J2EE application deployment descriptor DTD and a J2EE web application deployment descriptor DTD.

Reference 502 identifies a reference to another application, library, service or interface outside the application to which the deployment descriptor pertains. Note that the other application, library, service or interface may be an extension from the J2EE specification or may be defined by the J2EE specification because the application deployment descriptor DTD defined by the J2EE specification (a portion of which os shown at 207 of FIG. 2) does not include any such reference.

Reference Type 503 indicates whether the reference is "hard" or "weak". Reference Target 504 provides the name of the application, library, service or interface which is being referred to (which corresponds to the actual reference itself). As such a "name" based reference is implemented. Target Type 505 describes whether the reference refers to a library, interface, service, or application. Provider Name 506 describes the provider of the component that the reference refers to.

A separate set of elements 502-506 are included in the deployment descriptor for each reference that is to be identified in the deployment descriptor.

Classpath

Classpath 507 contains a classpath to an external resource that the application uses but which is not necessary to be available when the application is being deployed. However, it should be available when the application is started and when it needs to use the resource.

Provider Name

Provider Name 508 identifies the provider of the application to which the deployment descriptor pertains. The provider name is useful at least in situations where two or more applications to be deployed have the same name but come from a different provider (i.e., they can be differentiated by their provider rather than their name).

Additional Modules

Modules-Additional 509 identifies one or more application modules (e.g., one or more components of the application to which the deployment descriptor pertains) that must be distributed to one or more containers that are not standard J2EE containers (e.g., a J2EE container having service extensions). Module 510 and its constituent elements Entry Name 511 and Container Type 512 identify the particular application component(s) to be distributed (Entry Name 511) and the container(s) to which it is to be distributed (Container Type 512).

Failover

Failover Enable 513, on a broader level, identifies whether or not an extended service is to be enabled or not. In an embodiment, the standard specification J2EE services are extended with a "failover" service that effectively "backs up" session objects, through a process referred to as serialization, by storing them into persistent storage. On a broader scale the serialization process can be viewed as the backing up of a running software routine's state information. Mode 514 indicates, if the extended service is enabled, whether or not back-up is triggered for an HTTP session upon completion of each HTTP request or upon each attribute state change (modify, add, delete) during the HTTP session.

Start-Up

Start Up 516 also refers to a J2EE service extension in which the start time of the application to which the deployment descriptor pertains can be configured. The Mode 516 identifies whether: 1) the start time service is to be enabled for this application; 2) if 1) is true, whether the start time is: a) upon the application actually being requested for use ("lazy"); or, b) upon the startup of the server it is deployed upon ("always").

Non Standard Specification Web Application Deployment Descriptor Embodiment

FIG. 6 shows an embodiment of a J2EE web application descriptor DTD that is not provided for by the J2EE standard specification. A description of the relevance and use of each item in the DTD of FIG. 6 is provided immediately below. The DTD of FIG. 6 is expected to be used with the web application portion of an application.

At least some of the extensions to the J2EE specification that can be implemented from the DTD of FIG. 6 is summarized as follows and described in more detail immediately below: 1) The web application effectively declares that it will use certain "services" (interfaces or server services) or ejb beans registered in the JNDI naming directory by making a JNDI reference to them; 2) One or more login modules that are already deployed on the server (e.g., by being registered in a security provider service) can be declared to allow the web application to use them; 3) the web application can make references to real security roles that are active on the server and provided by the server's security service; 4) single sign on between few web applications deployed on the server can be established by way of security policy domains; and, 5) invocation of a "failover alert" service extension in which the web container provides a "service" for the clients of the web application in that they will be notified if the server on which their sessions are running will be shut down.

Root

Web NS 601 is the root element for the deployment descriptor of FIG. 6.

Resource Reference

Resource Reference 602 contains "additional" references to external resources that may be used by the web application that the deployment descriptor pertains to. These "additional" references are in addition to those already made possible by the existing web application DTD that is defined in the J2EE specification. However, a reference made through DTD elements 602-605 identifies the location of the external resource being referred to by its JNDI name. As the J2EE specification web application DTD does not provide for making references through a naming directory (to which JNDI is an interface for), the ability to do so as described herein effectively corresponds to a service extension.

Resource Reference Name 603 identifies the name of the external resource reference.

Resource Link 604 specifies the JNDI name of the external resource. In an embodiment, the value of this tag depends on the type of the external reference.

Non Transactional 605 specifies if the resource reference is transactional. In an embodiment, the default is transactional.

For each resource reference a separate group of elements 602-605 will exist.

Resource Environment

Resource Environment Reference 606 contains a reference to an object in the web application's environment.

Resource Environment Reference Name 607 identifies the name of the reference to which reference 606 pertains.

JNDI Name 608 specifies the JNDI name of the referenced resource.

EJB Reference

EJB Reference 609 contains a reference to an enterprise bean outside the web container that the web application is deployed within. These EJB references are in addition to those already made possible by the existing web application DTD that is defined in the J2EE specification. However, a reference made through DTD elements 609-611 identifies the location of the external resource being referred to by its JNDI name. As the J2EE specification web application DTD does not provide for making EJB references through a naming directory, the ability to do so as described herein effectively corresponds to a service extension.

EJB Reference Name 610 provides the name of the enterprise bean reference to which reference 609 pertains.

JNDI Name 611 specifies the location of the EJB in JNDI.

For each EJB reference a separate group of elements 609-611 will exist.

EJB Local Reference

EJB Local Ref 612 contains a reference to the enterprise bean's local home interface. As such EJB Local Reference is used when the enterprise bean is within the web container that the web application is deployed within.

EJB Reference Name 613 provides the name of the enterprise bean reference to which reference 612 pertains.

JNDI Name 614 provides the JNDI name of the EJB local reference.

For each EJB local reference a separate group of elements 612-614 will exist.

Server Component Reference

Server Component Reference 615 identifies a reference to a specific service or interface to a service. Here, the service or interface may be an extension that is not described by the applicable standard.

Name 616 identifies the name of the service or interface.

Type 617 identifies whether the reference is to a service or an interface to a service.

JNDI Name 618 provides the JNDI name of the service or interface.

Description 619 provides a human readable description of the service that is being referred to.

For each server component reference a separate group of elements 615-619 will exist.

Security Role Map

Security Role Map 620 contains the web application's security roles that are mapped to the base environment's security roles. The current J2EE specification web.xml provides for a "security" element. However, the web application will only declare in this security element the names of the security roles that it will use. The role names of element 620 are associated with real security roles available on the server or with users and user groups already defined for use by the server's security and user management services. As such, element 620 allows for the application to use pre-existing security roles and users provided by a server's security and user management services.

Role Name 621 specifies the name of the user existing on the server to which the security role is mapped.

Server Role Name 624 specifies the name of the server roles that are mapped to specific web application's security roles. This option is available when working offline and online.

Response Status

Response Status 625 defines code for an HTTP response.

Code 626 specifies the value for the code defined by Response Status 625.

Description 627 provides the short text for the response code defined and identified by 625 and 626.

For each response status a separate group of elements 625-627 will exist.

Fail-Over-Alert

Fail-Over-Alert 628 defines an alert message warning that will be sent to the active clients of the application if the server on which their session is running will be shut down. It also defines a timeout (before the server shutdown) when this message to be sent.

Message 629 provides the text of the warning message.

Message Timeout 630 specifies a timeout in minutes before server shutdown, when the warning message must be sent Login Module Configuration DTD elements 631-642 are for configuring a particular security authentication mechanism to be used for the web application. Here, the JAAS architecture is assumed in which a login context understands which login module is appropriate for a given situation. Each login module contains code to support a particular authentication technique. It is assumed that the actual login modules are already deployed on the server or are included in the current web application. The web application is therefore able to use and configure the authentication "service" provided by the described login modules that are already (or will be) deployed and registered in the server's security service.

Login Module Configuration 631 defines login modules and password changing settings for the web application.

Login Module Stack 632 contains login modules within the application.

Login Module 633 contains a particular login module's settings. It defines the authentication method and its priority.

Login Module Name 634 specifies the name of the particular login module.

Flag 635 specifies the priority of the authentication method in the login module. In an embodiment the options are: optional, required, requisite, and sufficient.

Options 636 contain specific features for the particular login module.

Option 637 defines a specific login module option. Each option is in key=value format.

Value 639 specifies the value of the login module specific option.

Password Change Config 640 defines the login page and the error page to customize a change to the user password.

Login Page 641 specifies the login page that is displayed when the login password for the user expires and a new one has to be set.

Error Page 642 specifies the error page that is displayed if the login fails.

Session Tracking

URL Session Tracking 643 specifies if the web application will associate user sessions by URL or by a cookie. The J2EE specification defines that if cookies are present in an http request, then cookie session tracking—and not url session tracking—must be used. Element 643 allows for url session tracking even if a cookie is present. Moreover, in an embodiment, by default, user sessions are associated by cookie.

Security Policy Domain

Security Policy Domain 644 defines the security policy domain for the application. A security policy domain is a protected region that authorization access will be given to provided specific authentication criteria is met.

Max No. of User Sessions

Max Sessions 645 specifies the maximum number of http sessions for the application.

Cookies

Cookie Config 646 contains a configuration of session or application cookies Cookie 647 specifies the attributes that the web container will use when creating session or application cookies.

Type 648 specifies the type of cookie. In an embodiment it must be "session" or "application".

Path 649 specifies the path of the cookie.

Domain 650 specifies the domain of the cookie. In an embodiment it can be "server" in which case the application's web container will set a domain value as the host name for the request; "none" in which case the application's web container will not set a domain attribute; or, a string value that the application's web container will use for the domain value.

Max Age 651 specifies the lifetime of the cookie (e.g., in seconds). In an embodiment a limited lifetime setting can be avoided by inserting a value of −1.

Processes taught by the discussion above may be performed with program code such as machine-executable instructions which cause a machine (such as a "virtual machine", general-purpose processor or special-purpose processor) to perform certain functions. Alternatively, these functions may be performed by specific hardware components that contain hardwired logic for performing the functions, or by any combination of programmed computer components and custom hardware components.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 7:
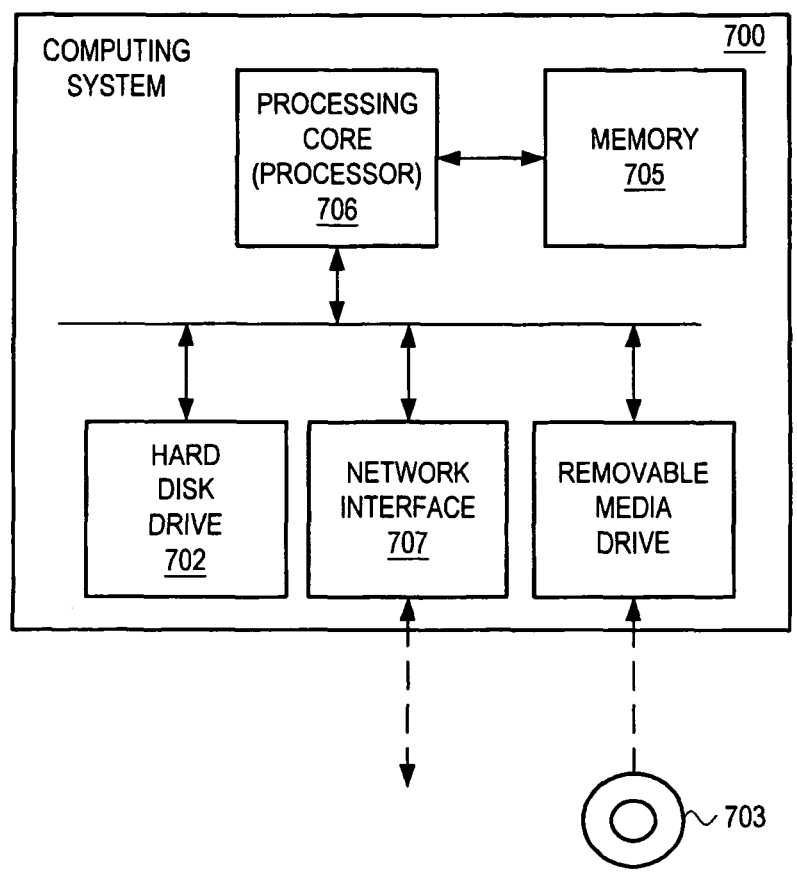
FIG. 7 shows an embodiment of a computing system.

FIG. 7 is a block diagram of a computing system 700 that can execute program code stored by an article of manufacture. It is important to recognize that the computing system block diagram of FIG. 7 is just one of various computing system architectures. The applicable article of manufacture may include one or more fixed components (such as a hard disk drive 702 or memory 705) and/or various movable components such as a CD ROM 703, a compact disc, a magnetic tape, etc. In order to execute the program code, typically instructions of the program code are loaded into the Random Access Memory (RAM) 705; and, the processing core 706 then executes the instructions.

It is believed that processes taught by the discussion above can be practiced with various software environments such as, for example, object-oriented and non-object-oriented programming environments, Java based environments (such as a Java 2 Enterprise Edition (J2EE) environment or environments defined by other releases of the Java standard), or other environments (e.g., a .NET environment, a Windows/NT environment each provided by Microsoft Corporation).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method of deploying an application, the method comprising:

in an application archive associated with said application, said application archive including a first deployment descriptor and a second deployment descriptor, said first deployment descriptor associated with an application-level of a hierarchy of deployment descriptors associated with said application and said second deployment descriptor associated with a module-level of said hierarchy, each of said first and second deployment descriptors conforming to a first document type definition that is defined by a standard specification, inserting a third deployment descriptor and a fourth deployment descriptor, each of said third and fourth deployment descriptors conforming to a second document type definition that is not defined by said standard specification, each of said third and fourth deployment descriptors having an element directed to a service that is an extension to said services offered by an environment described by said standard specification, each of said first and third deployment descriptors providing configuration information that pertains to said application as a whole; and each of said second and fourth deployment descriptors providing configuration information that pertains to a module of said application, said third deployment descriptor associated with said application-level of said hierarchy, said fourth deployment descriptor associated with said module-level of said hierarchy, each of said first deployment descriptor, second deployment descriptor, third deployment descriptor, and fourth deployment descriptor to be used at deployment time; and deploying said application consistently with said configuration information provided in said first and third deployment descriptors and said configuration provided in said second and fourth deployment descriptors.

2. The method of claim 1 wherein said standard specification is a J2EE standard specification.

3. The method of claim 1 wherein said first and third deployment descriptors are both application deployment descriptors.

4. The method of claim 3, further comprising interpreting said information from both of said deployment descriptors as application deployment descriptor information for said application.

5. The method of claim 1, wherein said second document type definition comprises an element for a named reference to an item of software outside said application and selected from the group consisting of:
- another application;
- a library;
- a service; and,
- an interface.

6. The method of claim 1, wherein said second document type definition comprises an element to identify a classpath to a resource outside said application that said application is designed to use.

7. The method of claim 1, wherein said second document type definition comprises an element to identify said application's provider.

8. The method of claim 1, wherein said second document type definition comprises an element to identify one or more modules of said application that are to be distributed to one or more containers that are not standard J2EE containers.

9. The method of claim 1, wherein said second document type definition comprises an element to indicate whether or not a failover service is enabled, said failover service being said extension.

10. The method of claim 1, wherein said second document type definition comprises an element that indicates a start time for said application, said ability to specify said start time being said extension.

11. The method of claim 1 wherein said second and fourth deployment descriptors are both web application deployment descriptors, said application being a web application.

12. The method of claim 11 wherein said second document type definition comprises an element for a reference to a resource external to said web application, said reference being a JNDI name.

13. The method of claim 11 wherein said second document type definition comprises an element for a reference to an object in an environment of said web application, said reference being a JNDI name.

14. The method of claim 11 wherein said second document type definition comprises an element to define a login module for said web application.

15. The method of claim 11 wherein said second document type definition comprises an element to define a password changing setting for said web application.

16. The method of claim 1, wherein said second document type definition comprises an element for a reference to an enterprise java bean, said reference being a JNDI name.

17. The method of claim 1, wherein said second document type definition comprises an element to identify security roles that are available on a server upon which said application is to be deployed.

18. The method of claim 1, wherein said second document type definition comprises an element having information to construct an HTTP response.

19. The method of claim 1, wherein said second document type definition comprises an element to invoke a fail alert service in which an alert message warning is sent to a client of said application to alert said client that a server on which said application is running will be shut down, said fail alert service being said extension.

20. The method of claim 1, wherein said second document type definition comprises an element to specify if user sessions will be tracked by a URL or by a cookie.

21. The method of claim 1, wherein said second document type definition comprises an element to specify a security policy domain for said application.

22. The method of claim 1, wherein said second document type definition comprises elements to describe a cookie, said cookie being an application cookie or a session cookie.

23. The method of claim 1 wherein said inserting is performed by a deploy tool.

24. The method of claim 1 wherein said inserting is performed upon a server targeted for deployment of said application.

25. An article of manufacture including program code which, when executed by a machine, causes the machine to perform operations for deploying an application, the operations comprising:
- in an application archive associated with said application, said application archive including a first deployment descriptor and a second deployment descriptor, said first deployment descriptor associated with an application-level of a hierarchy of deployment descriptors associated with said application and said second deployment descriptor associated with a module-level of said hierarchy, each of said first deployment descriptor and said second deployment descriptor conforming to a first document type definition that is defined by a standard specification,
- inserting a third deployment descriptor and a fourth deployment descriptor, each of said third and fourth deployment descriptors conforming to a second document type definition that is not defined by said standard specification, each of said third and fourth deployment descriptors having an element directed to a service that is an extension to said services offered by an environment described by said standard specification, said first and third deployment descriptors providing configuration information that pertains to said application as a whole, said second and fourth deployment descriptors providing configuration information that pertains to a module of said application, said third deployment descriptor associated with said application-level of said hierarchy, said fourth deployment descriptor associated with said module-level of said hierarchy, each of said first deployment descriptor, second deployment descriptor, third deployment descriptor, and fourth deployment descriptor to be used at deployment time; and
- deploying said application consistently with said configuration information provided in said first and third deployment descriptors and said configuration provided in said second and fourth deployment descriptors.

26. The article of manufacture of claim 25 wherein said standard specification is a J2EE standard specification.

27. The article of manufacture of claim 25 wherein said first and third deployment descriptors are both application deployment descriptors.

28. The article of manufacture of claim 27, wherein said second and fourth deployment descriptors are both web application deployment descriptors.

29. The article of manufacture of claim 28 wherein said second document type definition comprises an element for a reference to a resource external to said application, said application being a web application, said reference being a JNDI name.

30. The article of manufacture of claim 28 wherein said second document type definition comprises an element for a reference to an object in an environment of said web application, said reference being a JNDI name.

31. The article of manufacture of claim 28 wherein said second document type definition comprises an element to define a login module for said web application.

32. The article of manufacture of claim 28 wherein said second document type definition comprises an element to define a password changing setting for said web application.

33. The article of manufacture of claim 25, wherein said second document type definition further comprises an element for a named reference to an item of software outside said application and selected from the group consisting of:
another application;
a library;
a service; and,
interface.

34. The article of manufacture of claim 25, wherein said second document type definition comprises an element to identify a classpath to a resource outside said application that said application is designed to use.

35. The article of manufacture of claim 25, wherein said second document type definition comprises an element to identify said application's provider.

36. The article of manufacture of claim 25, wherein said second document type definition comprises an element to identify one or more modules of said application that are to be distributed to one or more containers that are not standard J2EE containers.

37. The article of manufacture of claim 25, wherein said second document type definition comprises an element to indicate whether or not a failover service is enabled, said failover service being said extension.

38. The article of manufacture of claim 25, wherein said second document type definition comprises an element that indicates a start time for said application, said ability to specify said start time being said extension.

39. The article of manufacture of claim 25, wherein said second document type definition comprises an element for a reference to an enterprise java bean, said reference being a JNDI name.

40. The article of manufacture of claim 25, wherein said second document type definition comprises an element to identify security roles that are available on a server upon which said application is to be deployed.

41. The article of manufacture of claim 25, wherein said second document type definition comprises an element having information to construct an HTTP response.

42. The article of manufacture of claim 25, wherein said second document type definition comprises an element to invoke a fail alert service in which an alert message warning is sent to a client of said application to alert said client that a server on which said application is running will be shut down, said fail alert service being said extension.

43. The article of manufacture of claim 25, wherein said second document type definition comprises an element to specify if user sessions will be tracked by a URL or by a cookie.

44. The article of manufacture of claim 25, wherein said second document type definition comprises an element to specify a security policy domain for said application.

45. The article of manufacture of claim 25, wherein said second document type definition comprises elements to describe a cookie, said cookie being an application cookie or a session cookie.

46. The article of manufacture of claim 25 wherein said inserting of said deployment descriptors is performed by a deploy tool.

47. The article of manufacture of claim 25 wherein said inserting of said deployment descriptors is performed upon a server targeted for deployment of said application.

48. A computing system comprising instructions disposed on a computer readable medium, said instructions capable of being executed by said computing system to cause the computer system to perform operations comprising:
in an application archive associated with said application, said application archive including a first deployment descriptor and a second deployment descriptor, said first deployment descriptor associated with an application-level of a hierarchy of deployment descriptors associated with said application and said second deployment descriptor associated with a module-level of said hierarchy, each of said first deployment descriptor and said second deployment descriptor conforming to a first document type definition that is defined by a standard specification,
inserting a third deployment descriptor and a fourth deployment descriptor, each of said third and fourth deployment descriptors conforming to a second document type definition that is not defined by said standard specification, each of said third and fourth deployment descriptors having an element directed to a service that is an extension to said services offered by an environment described by said standard specification, said first and third deployment descriptors providing configuration information that pertains to said application as a whole, said second and fourth deployment descriptors providing configuration information that pertains to a module of said application, said third deployment descriptor associated with said application-level of said hierarchy, said fourth deployment descriptor associated with said module-level of said hierarchy, each of said first deployment descriptor, second deployment descriptor, third deployment descriptor, and fourth deployment descriptor to be used at deployment time; and
deploying said application consistently with said configuration information provided in said first and third deployment descriptors and said configuration provided in said second and fourth deployment descriptors.

49. An apparatus comprising:
means for, in an application archive associated with said application, said application archive including a first deployment descriptor and a second deployment descriptor, said first deployment descriptor associated with an application-level of a hierarchy of deployment descriptors associated with said application and said second deployment descriptor associated with a module-level of said hierarchy, each of said first deployment descriptor conforming to a first document type definition that is defined by a standard specification,
inserting a third deployment descriptor and a fourth deployment descriptor, each of said third and fourth deployment descriptors conforming to a second document type definition that is not defined by said standard specification, each of said third and fourth deployment descriptors having an element directed to a service that is an extension to the services offered by an environment described by said standard specification, said first and third deployment descriptors providing configuration information that pertains to said application as a whole, said second and fourth deployment descriptors providing configuration information that pertains to a module of said application, said third deployment descriptor associated with said application-level of said hierarchy, said fourth deployment descriptor associated with said module-level of said hierarchy, each of said first deployment descriptor, second deployment descriptor, third deployment descriptor, and fourth deployment descriptor to be used at deployment time; and means for deploying said application consistently with said configuration information provided in said first and third deployment descriptors and said configuration provided in said second and fourth deployment descriptors.

50. A method comprising:

for a first instance of an application that is targeted to an environment that includes additional services that complement a set of services specified by a standard specification:

in an application archive associated with said first instance of said application, said application archive including a first deployment descriptor and a second deployment descriptor, said first deployment descriptor associated with an application-level of a hierarchy of deployment descriptors associated with said application and said second deployment descriptor associated with a module-level of said hierarchy, each of said first and second deployment descriptors conforming to a first document type definition that is defined by said standard specification, inserting a third deployment descriptor and a fourth deployment descriptor, each of said third and fourth deployment descriptors conforming to a second document type definition that is not defined by said standard specification, each of said third and fourth deployment descriptors having an element directed to a service that is an extension to said services offered by an environment described by said standard specification, said third deployment descriptor associated with said application-level of said hierarchy, said fourth deployment descriptor associated with said module-level of said hierarchy, each of said first deployment descriptor, second deployment descriptor, third deployment descriptor, and fourth deployment descriptor to be used at deployment time;

recognizing an existence of said third and fourth deployment descriptors and deploying said first instance of said application consistently with information found in said third and fourth deployment descriptors; and, for a second instance of an application that is targeted to an environment that does not include said additional services that complement said set of services specified by said standard specification, in said application archive, not inserting said third and fourth deployment descriptors.

* * * * *